Sept. 23, 1958 V. D. HERSHBERGER 2,853,340
TELESCOPING ROOF FOR TRUCKS AND TRAILERS
Filed Dec. 17, 1956 2 Sheets-Sheet 1
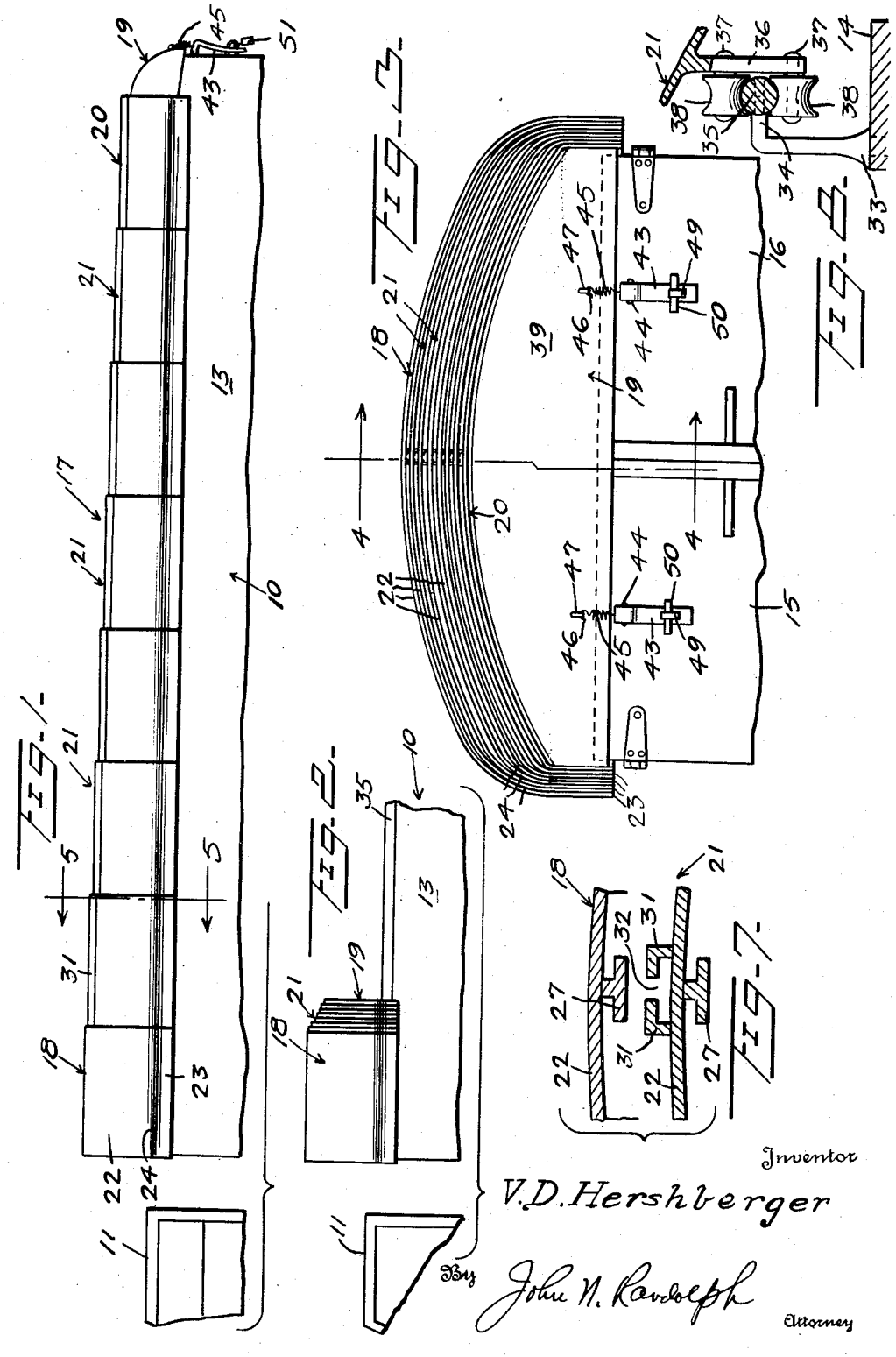
Inventor
V.D. Hershberger
By John N. Randolph
Attorney

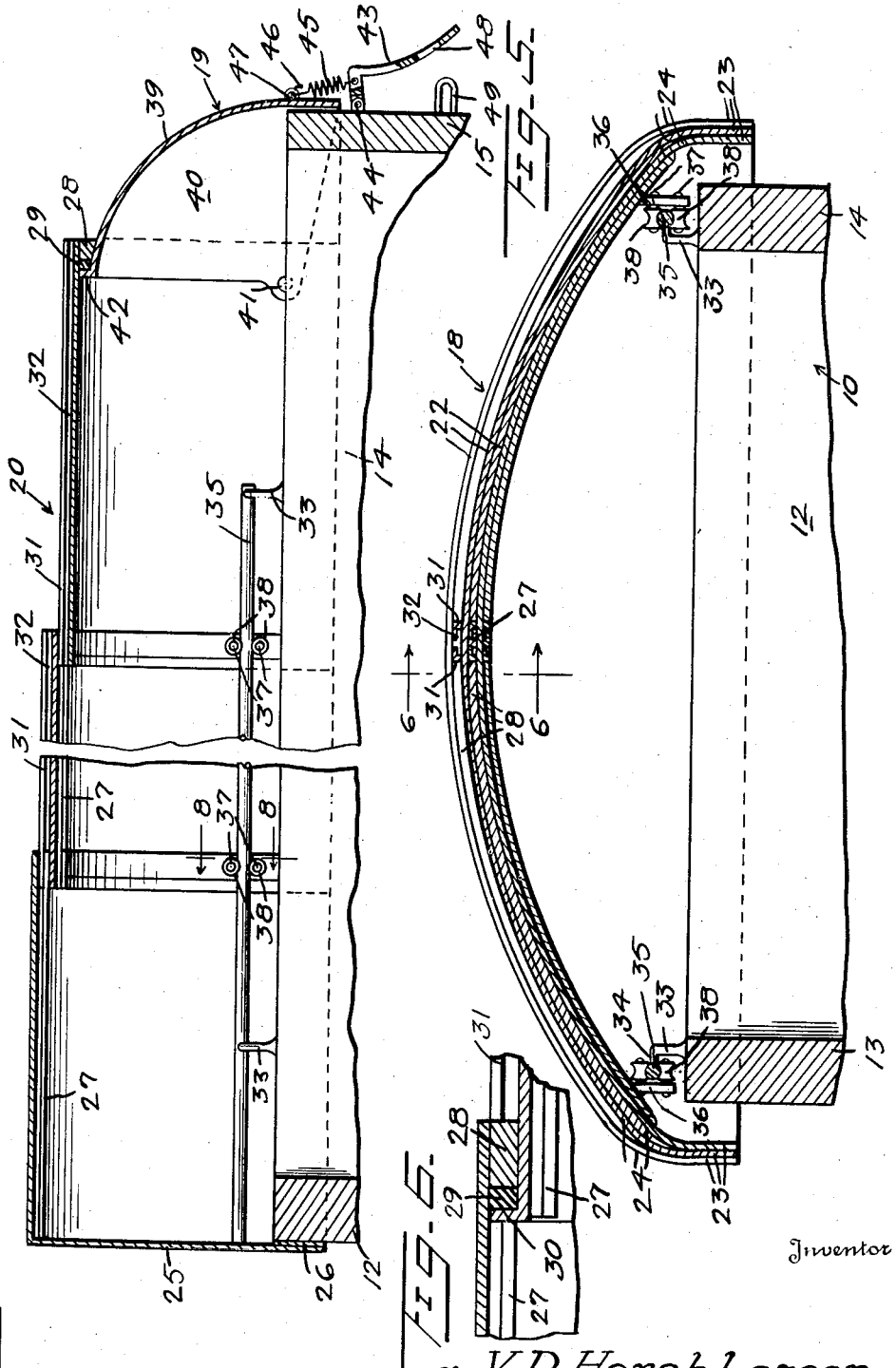

United States Patent Office 2,853,340
Patented Sept. 23, 1958

2,853,340

TELESCOPING ROOF FOR TRUCKS AND TRAILERS

Vilas D. Hershberger, Hesston, Kans.

Application December 17, 1956, Serial No. 628,668

4 Claims. (Cl. 296—137)

This invention relates to a novel rigid roof for trucks and trailers formed of telescopically connected roof sections mounted for sliding movement longitudinally of the truck or trailer body and which may be telescopically forwardly to an open position for exposing a substantial part of the top of the body, or extended rearwardly to completely cover and close the body top.

More particularly, it is a primary aim of the present invention to provide a roof to replace canvas tarpaulins commonly used to cover truck and trailer bodies and to eliminate the numerous disadvantages and inconveniences inherent in the use of such tarpaulins, including the center ridge pole and crossbars forming the supporting frame for the tarpaulin and which are not removable so that the top of the body is not completely exposed for loading and unloading; the difficulty in applying and removing the tarpaulin cover in wet and windy weather, and the difficulty in keeping the tarpaulin sufficiently taut to prevent flapping and billowing when the truck or trailer is in motion without the risk of the tarpaulin being torn due to shrinkage in the event that it becomes wet.

Another object of the invention is to provide a telescoping roof formed of rigid sections which may be opened and closed progressively during loading and unloading of the truck or trailer in inclement weather so that the load will not be exposed to the elements for any appreciable time during the loading and unloading operation.

Still another object of the invention is to provide a roof which will permit loading and unloading of the truck through the exposed top of the truck or trailer body.

Various other objects and advantages of the invention will hereinafter become more fully apparent from the following description of the drawings, illustrating a presently preferred embodiment thereof, and wherein:

Figure 1 is a side elevational view of the upper portion of a truck or trailer body and showing the telescoping roof in a closed position;

Figure 2 is a fragmentary side elevational view of the upper part of the forward portion of the truck or trailer body and showing the roof telescoped forwardly to an open position;

Figure 3 is an enlarged end elevational view looking toward the rear end of the truck or trailer body showing the upper portion thereof and the roof in a closed position, and on an enlarged scale;

Figure 4 is an enlarged fragmentary longitudinal sectional view, taken substantially along a plane as indicated by the line 4—4 of Figure 3;

Figure 5 is an enlarged cross sectional view taken substantially along a plane as indicated by the line 5—5 of Figure 1;

Figure 6 is an enlarged fragmentary longitudinal sectional view through a portion of the roof, taken substantially along a plane as indicated by the line 6—6 of Figure 5;

Figure 7 is an enlarged fragmentary cross sectional view of the central portions of two of the roof sections shown disconnected from one another, and Figure 8 is an enlarged fragmentary cross sectional view taken substantially along a plane as indicated by the line 8—8 of Figure 4.

Referring more particularly to the drawings, the upper portion of a truck or trailer body of a conventional construction is designated generally 10 and a portion of a truck or tractor cab 11 is shown forwardly of the body 10. The body 10 includes a front wall 12, side walls 13 and 14 and hinged doors 15 and 16 for closing the open rear end of the truck body 10 and which are swingably connected to the rear ends of the side walls 13 and 14, respectively. The parts previously referred to are of conventional construction.

The telescoping roof in its entirety and comprising the invention is designated generally 17. As illustrated, the roof 17 is shown formed of a front section 18, a rearmost section 19, a section 20 which is disposed immediately in front of the section 19, and a plurality of intermediate sections, each designated generally 21 and which are disposed between the sections 18 and 20. The number of the sections 21 which are utilized will depend upon the length of the body 10 and the lengths of the individual roof sections 18, 20 and 21.

The front section 18 includes an upwardly bowed top wall 22 which curves and slopes downwardly from the top center portion thereof in both directions. The curvature of the top portion 22 extends downwardly on each side to substantially the level of the top of the body 10, as seen in Figure 5, and said top wall has substantially parallel straight side edge portions 23 which extend downwardly from the side edges of the top portion 22 to approximately four inches below the level of the top of the body 10. The top portion 22 has side portions 24 which merge with the side edge portions 23 and which are of increased curvature relative to the remainder of the top portion 22. The front section 18 also includes a substantially flat front wall 25 which is integrally joined with the front edge of the top portion 22 and the front edges of the portions 23 and 24 and which extends downwardly to the level of the bottom edges of the portions 23. The lower part of the front wall 25 is suitably secured as seen at 26 to the upper portion of the forward side of the front wall 12. The underside of the top central or ridge of the front section 18 is provided with a rib 27 which is of inverted T-shape in cross section and extends from front to rear thereof. The front roof section 18 has rigid strips 28 secured to the underside of its rear end and which extend outwardly and downwardly on opposite sides of the rib 27. The outer ends of the strips 28 terminate at the side portions 24 and above and spaced from the side edge portions 23, as seen in Figure 5. The adjacent ends of the strips 28 are spaced slightly from the rib 27. A cushioning strip 29 of rubber or other cushioning and sealing material is secured to the inner or forward edge of each strip 28 and extends from end-to-end thereof.

Each of the intermediate sections 21 includes a top portion 22, side portions 24 and side edge portions 23, corresponding to said portions of the front section 18 except that the forwardmost intermediate section 21 is slightly smaller, transversely of the truck body 10, than the front section 18, and each of the other intermediate sections 21 is slightly smaller than the section disposed immediately in front thereof. Furthermore, said intermediate sections 21 are open at each end and each is provided on its underside with a rib 27, corresponding to the rib 27 of the section 18, and on its underside and at its rear end with strips 28 and 29, corresponding to the strips 28 and 29, respectively of the section 18. In addition, the forward end of each intermediate section 21 has upturned flanges 30 which are coextensive with the strips 28 and 29 thereof. Additionally, the upper side of the central portion of each section 21 is provided with a pair of longitudinally extending angle members 31 which cooperate with one another to form an upwardly opening groove 32 of a cross sectional shape corresponding to the ribs 27 and of a size to slidably receive a rib 27. The rib 27 of the forward section 18 is received in the groove 32 of the forwardmost section 21 and is slidably engaged by the angle members 31 of said section 21. After the forwardmost section 21 has thus been telescopically connected to the front section 18, the upturned flanges 30 are formed and said flanges abut the cushioning strips 29 of the section 18 when said section 21 is extended rearwardly, to limit the extent that the section 21 can be extended rearwardly relative to the front section 18 and for sealing the joint between said sections 18 and 21 when the section 21 is in a fully extended position. The section 20 is slightly smaller, crosswise of the body 10, than the rearmost section 21 so as to fit telescopically therein. The section 20 differs from the sections 21 in that it is not provided with an internal rib 27 and has a single strip 28 and strip 29 at its rear end which extend completely across the rear end thereof and down to the side edge portions 23 of said section 20. The external groove or channel 32 of said rear section 20 slidably engages the rib 27 of the rearmost section 21.

Short posts 33 are fixed to and rise from the upper edges of the side walls 13 and 14 and have outturned upper ends 34 which are secured to and support rails 35. A rail 35 is supported above and spaced from the upper edge of each wall 13 and 14. Each of the roof sections 21 and 20 has a pair of bracket arms 36 fixed to and depending from the underside of the forward end thereof. The bracket arms 36 are located near the side edges of the roof sections and straddle the rails 35, and each has a pair of vertically spaced pins 37 extending from the inner side thereof for journaling a pair of vertically spaced rollers 38. The rollers 38 are grooved and engage above and beneath the rails 35 for supporting the slidable roof sections 20 and 21. The rails 35 bear substantially the entire weight of said slidable roof sections so that said sections can telescope freely relative to one another and into the front section 18. The rollers 38 have a sufficient close fitting engagement with the rails 35 to prevent any lateral or up and down movement of the roof sections relative to the body 10.

The rear section 19 includes a top wall 39 which is curved both longitudinally and transversely of the roof 17 and the longitudinal curvature of which constitutes an arc of somewhat greater than 90°. The section 19 includes corresponding side portions 40 which are pivotally connected by pins 41 to the inner sides of the side portions 24 of the section 20. The pins 41 are disposed at the center of an arc described by the lengthwise curvature of the wall 39, so that said section 19 can swing into and partially out of the section 20. The upper or rear end of the wall 39 has an outturned lip 42 which engages the cushioning strip 29 of the section 20 to limit the extent that the rear roof section 19 can be swung rearwardly and downwardly. When the roof 17 is in a fully extended position and with the rear section 19 extended downwardly and rearwardly, as seen in Figures 1 and 4, the lower rear portion of the wall 39 overlies the upper portions of the doors 15 and 16 for completely closing the open top of the body 10.

A latch arm 43 is pivotally mounted at 44 on the outer side of each door 15 and 16 beneath the roof section 19, as seen in Figure 4. A pull spring 45 has an end secured to the latch arm 43 at a point spaced from its pivot 44 and is provided with a hook 46 at its opposite free end to detachably engage a staple 47 which extends outwardly from the wall 39. The hook 46 can be engaged with or disengaged from the staple 47 when the latch arm 43 is swung upwardly and toward said staple. The latch arm 43 is then swung downwardly to cause a slot 48 thereof to pass over a staple 49 which extends outwardly from the door on which the latch arm is mounted. A pin 50, as seen in Figure 3, or a padlock 51, as seen in Figure 1, can then be engaged with the staple 49, on the outer side of the latch arm 43, to retain the two latch hooks 46 in engagement with the staples 47 and with the springs 45 thereof under tension, so that the roof 17 will be securely held in its extended position, closing the top of the body 10.

The roof sections 18, 19, 20 and 21 may be formed of any suitable sheet material, preferably a lightweight material such as aluminum.

It will be readily apparent that with the latch hooks 46 released the rear section 19 can be swung upwardly and forwardly into the section 20 after which said section 20 can be telescoped forwardly into the rearmost section 21 and the sections 21 then telescoped forwardly into one another and into the front section 18 for exposing all of the top of the body 10 except the foremost part thereof over which the front roof section 18 is disposed. With the roof 17 thus telescoped forwardly to an open position, as illustrated in Figure 2, and the doors 15 and 16 open, the body 10 can be readily loaded and unloaded through the open top and open rear end thereof. The roof 17 can then be slidably moved rearwardly back to its closed position of Figures 1 and 4 for completely closing and sealing the top of the body 10.

It will be understood that thicknesses of the parts of the roof sections have been exaggerated considerably in the drawings. For example, the side edge portions 23 of the roof sections when telescoped into one another will not protrude outwardly more than two inches from the side walls 13 and 14.

It will be readily apparent that the roof 17 may be readily opened and closed by the driver of the truck or trailer without the assistance of others. It will also be apparent that the roof 17 can be opened and closed progressively as a truck is unloaded or loaded, respectively, for protecting the load from inclement weather during the loading and unloading operations.

Various modifications and changes are contemplated and may be resorted to, without departing from the function or scope of the invention as hereinafter defined by the appended claims.

I claim as my invention:

1. A telescoping roof for truck and trailer bodies comprising an elongated roof adapted to be disposed over the open top of an elongated truck or trailer body, said roof being upwardly bowed transversely thereof and of the body and having substantially straight side edge portions adapted to extend downwardly on the outer sides of the body sides, said side edge portions being disposed substantially parallel to one another, said roof comprising a plurality of interfitting telescopically connected sections extending lengthwise of the roof, said telescopically connected roof sections telescoping forwardly into one another such that each roof section telescopes forwardly into the roof section disposed immediately in front thereof, a forwardmost roof section of the telescoping roof being rigidly secured to the body and containing the other sections of the roof in a nested position therein and at the forward end of the body in an open position of the telescoping roof, and interfitting rib and groove means interconnecting said telescoping sections and disposed along the ridge of the roof, said roof including a rearmost section, means swingably mounting said rearmost section in a rearmost one of said slidable telescoping sections, said rearmost swingably mounted section being swingable downwardly and rearwardly from the rear end of the rearmost slidable section, when said slidable sections are in extended positions, to overlie the upper portion of the rear end of the body.

2. A telescoping roof as in claim 1, and resilient latch means adapted to be supported by a part of the body and detachably connected to said swingably mounted rearmost roof section for yieldably retaining said roof section in a closed position overlying the upper portion of the rear end of the body.

3. A telescoping roof as in claim 1, said rigid front section including a front wall closing the forward end of said roof and having a lower portion adapted to overlie an upper portion of the forward end of the body.

4. In combination with a vehicle load conveying body having an open top, a front wall, side walls and closure means for closing the rear end of the truck body which is horizontally swingable outwardly to an open position; a telescoping roof disposed over the open top of said body, said roof being upwardly bowed transversely thereof and having substantially straight side edge portions extending downwardly on the outer sides of the body sides, said roof comprising a plurality of interfitting telescopically connected sections extending longitudinally of the roof and slidably interconnected to telescope forwardly into one another such that each roof section telescopes forwardly into the roof section disposed immediately in front thereof, said roof including a forwardmost section rigidly secured to the vehicle body and containing the other sections of the roof in a nested position therein at the forward end of the body in an open position of the roof, said forwardmost roof section having a front wall enclosing the forward end of the roof and overlying the upper portion of the front wall of the vehicle body, said roof including a rearmost section, means swingably mounting said rearmost section in a rearmost one of the slidable telescoping sections, said rearmost swingably mounted section being swingable downwardly and rearwardly from the rear end of the rearmost slidable section, when the slidable sections are in extended positions, to overlie the upper portion of said closure means and to maintain said closure means against swinging movement outwardly to an open position.

References Cited in the file of this patent

UNITED STATES PATENTS

| | | |
|---|---|---|
| 1,376,250 | Camp | Apr. 26, 1921 |
| 2,168,062 | Davey | Aug. 1, 1939 |
| 2,602,693 | Murphy | July 8, 1952 |

FOREIGN PATENTS

| | | |
|---|---|---|
| 566,844 | Germany | Dec. 24, 1932 |
| 223,789 | Great Britain | Oct. 30, 1924 |
| 329,088 | Great Britain | May 15, 1930 |
| 263,170 | Switzerland | Nov. 1, 1949 |